United States Patent [19]
Dunthorn

[11] Patent Number: 5,317,140
[45] Date of Patent: May 31, 1994

[54] DIFFUSION-ASSISTED POSITION LOCATION PARTICULARLY FOR VISUAL PEN DETECTION

[76] Inventor: David I. Dunthorn, 908 W. Outer Dr., Oak Ridge, Tenn. 37830

[21] Appl. No.: 980,915

[22] Filed: Nov. 24, 1992

[51] Int. Cl.⁵ .............................................. G01V 9/04
[52] U.S. Cl. .................................. 250/221; 250/206.1
[58] Field of Search .................... 250/221, 222.1, 216, 250/561, 206.2, 206.3, 203.3, 203.4; 340/710, 712; 356/141, 152

[56] References Cited

U.S. PATENT DOCUMENTS

| | | | |
|---|---|---|---|
| 2,986,596 | 5/1961 | Hammond, Jr. | 178/5.6 |
| 3,114,283 | 12/1963 | Gruner | 88/24 |
| 3,411,010 | 11/1968 | Genahr et al. | 250/227 |
| 3,411,011 | 11/1968 | Genahr et al. | 250/227 |
| 3,441,738 | 4/1969 | Dosch et al. | 250/219 |
| 3,455,637 | 7/1969 | Howard | 356/204 |
| 3,476,482 | 11/1969 | Howard et al. | 356/199 |
| 3,535,537 | 10/1970 | Powell | 250/227 |
| 3,584,142 | 6/1971 | Schoeffler | 178/6.8 |
| 3,673,327 | 6/1972 | Johnson et al. | 178/18 |
| 3,953,131 | 4/1976 | Britz | 356/141 |
| 4,052,616 | 10/1977 | Keller | 250/353 |
| 4,459,022 | 7/1984 | Morey | 356/152 |
| 4,491,727 | 1/1985 | Appelbaum | 250/203 |
| 4,507,557 | 3/1985 | Tsikos | 250/341 |
| 4,547,666 | 10/1985 | Heal | 250/227 |
| 4,550,250 | 10/1985 | Mueller et al. | 250/203 |
| 4,561,017 | 12/1985 | Greene | 358/93 |
| 4,565,999 | 1/1986 | King | 340/706 |
| 4,625,108 | 11/1986 | Nestel et al. | 250/227 |
| 4,648,052 | 3/1987 | Friedman et al. | 364/550 |
| 4,654,648 | 3/1987 | Herrington | 340/710 |
| 4,682,024 | 7/1987 | Halldorsson | 250/225 |
| 4,682,159 | 7/1987 | Davison | 340/709 |
| 4,688,933 | 8/1987 | Lapeyre | 356/1 |
| 4,737,625 | 4/1988 | Sasaki et al. | 250/221 |
| 4,746,770 | 5/1988 | McAlvinny | 178/18 |
| 4,782,328 | 11/1988 | Denlinger | 340/365 |
| 4,806,747 | 2/1989 | Dunavan et al. | 250/206.1 |
| 4,811,004 | 3/1989 | Person et al. | 340/712 |
| 4,820,050 | 4/1989 | Griffin | 356/375 |
| 4,891,508 | 1/1990 | Campbell | 250/221 |
| 4,891,630 | 1/1990 | Friedman et al. | 340/706 |
| 4,936,683 | 6/1990 | Purcell | 356/152 |
| 4,943,806 | 7/1990 | Masters et al. | 341/31 |
| 4,949,079 | 8/1990 | Loebner | 340/706 |
| 4,986,662 | 1/1991 | Bures | 356/375 |
| 4,988,981 | 1/1991 | Zimmerman et al. | 340/709 |
| 5,055,840 | 10/1991 | Bartlett | 341/31 |
| 5,073,770 | 12/1991 | Lowbner | 340/706 |
| 5,079,414 | 1/1992 | Martin | 250/206.2 |

FOREIGN PATENT DOCUMENTS 166384 8/1991 China .

OTHER PUBLICATIONS

Western Electric Technical Digest No. 22, Apr., 1971.
IBM Technical Disclosure Bulletin, vol. 23, No. 7B, Dec., 1980.

*Primary Examiner*—David C. Nelms
*Attorney, Agent, or Firm*—Luedeka, Neely & Graham

[57] ABSTRACT

Systems and methods for optically determining the direction of an object, such as a pointer, relative to an imaging system, particularly systems where triangulation is employed to determine the location of a pointer within a generally planar viewing field, such as a touch screen. Rather than employing focused imaging systems to produce a sharp image at the plane of a photodetector, and to thus define the visual pen for finger position, a deliberately diffuse or blurred image is employed. The diffusion produces a characteristic "bell-shaped" or Gaussian intensity distribution. By recognizing the characteristic intensity distribution, the position of the maximum intensity, and thus the direction of the object, can be determined to a small fraction of the distance between sample points, with an accordingly much higher resolution than focused systems. In a preferred embodiment, the position location system is incorporated into a computer system as a touch screen apparatus and a cursor is displayed on the screen as soon as a pointer is detected above the display.

40 Claims, 6 Drawing Sheets

DIFFUSION-ASSISTED POSITION LOCATION PARTICULARLY FOR VISUAL PEN DETECTION

BACKGROUND OF THE INVENTION

The present invention relates generally to systems for optically determining the direction of an object relative to an imaging system or for optically determining the position of an object such as a pointer and, more particularly, to the use of imaging systems placed about a computer display device to monitor the motions of a pointer.

There are so-called "touch screen" systems wherein a user interacts with a computer system by touching or pointing to various locations within a touch screen area, typically associated with a display such as a CRT, or other display device. The touch screen serves as easily used data input apparatus because the operator can quickly and easily feed data into a computer by indicating various specific positions of the touch screen area.

As employed herein, the term "pointer" refers to any suitable pointing object, externally illuminated or self-illuminated which is easily moved relative to a two-dimensional plane surface or area. By way of example and not limitation, the pointer may comprise a pen, stylus, finger, or any typically long and slim element.

As employed herein, the term "touch screen" means apparatus used to locate the position of a pointer within a generally planar viewing field. In accordance with the invention, such a viewing field may be an area defined on or near the surface of solid material, such as near an inert panel, or may be a geometric plane defined in space or in the air.

Such "touch screens" have many possible applications, for example: pointing to or selecting a particular image or region on a video screen or on a panel, plate or tablet to select or indicate a specific item, informational element, letter, number, symbol, parameter line, region or characteristic; to locate or track a pointer held generally perpendicular to the plane and moved along the plane for plotting data, drawing a graph or picture or for laying out a network or diagram; for indicating or tracking the relative motion or coordinates of movement or trajectory of a moving object; for use as a custom keyboard in an electronic input module; and so forth.

For convenience, the terminology "Stylus Detection" is employed herein to refer to the subject invention; it will be appreciated, however, that "stylus" refers to any "pointer" or other object whose direction relative to an imaging system or position is to be determined. In addition, the term "camera" is employed herein as a synonym to imaging system, where a "camera" may be characterized as an electronic device for capturing either one- or two-dimensional images and converting them to electrical signals for further processing.

In overview, the Stylus Detection system of the invention employs two or more cameras placed strategically about a computer display to obtain the position of the computer operator's hand or an object such as a pen or stylus. The precise position of the hand or object is determined using trigonometric triangulation. Pointer position, as well as signals derived from the change of position or the rate of change of position, can be interpreted as commands to the computer system.

The Stylus Detection devices of the invention most closely resemble what collectively have been called touch screens in the prior art. Touch screens themselves have been largely divided into two groups: overlay, in which a device sized to fit the display is placed over or attached to the display screen itself; and non-overlay, in which no such display-screen-covering device is required. Although not touch screens, the Stylus Detection devices of the invention could be classed as non-overlay.

At the present time, by far the most commonly used touch screen technologies are overlay. Overlay touch screens usually require placing a specially prepared device over the computer display and using the device to determine the position, in two dimensions, of the operator's finger or some other stylus. Typical examples involve one- or two-layer arrangements of glass or plastic sheets which have been coated or patterned with special materials so that the position of a stylus or finger touch can be determined by making resistance or capacitance measurements on the device. Another approach broadcasts acoustic waves on the surface of a specially prepared piece of glass and determines two-dimensional positions by timing when the waves have been attenuated by a touch from a finger or other sufficiently compliant stylus. This latter device lays claim to a third-dimension sensing capability, but the "third dimension" actually relates to firmness of touch, since no detection at all takes place until the finger or stylus is firmly in contact with the display screen.

In addition to being unable to detect the position of a pointing device before it is actually in contact with the device surface, overlay technologies suffer from several other problems. Any nominally transparent overlay material reduces light transmission from the display and also is an increased source of distracting reflections from the face of the display. Reflections are greatly increased for technologies such as resistive and capacitive touch screens since the required overlays are coated with a metallic film that acts as a mirror. These overlays are often covered with diffusive coatings used to reduce the added reflections, but the diffusion also reduces the sharpness of the display. Thus the net result of applying overlay technology is a dimmer display which may also have a fuzzy appearance or disturbing surface reflections. These problems are especially serious when dealing with liquid crystal displays, which are characteristically dimmer than desired even without the overlay.

Overlays also increase the problem of parallax. The thickness of the overlay increases the distance between the display image plane and the point of touch. When the user moves his head, and thus the position of his eyes, a fixed point being touched on the surface of the touch screen appears to move relative to the display image plane underneath. As a perpendicular distance between the image plane and the point of touch is increased, this parallax effect is magnified accordingly.

Overlay sensors also present a major logistical problem for manufacturers. Typically, each model of computer display requires a specially designed and configured overlay sensor. Even displays of the same nominal size tend to differ slightly in actual visible display area, in curvature of the display surface, or even in the available space behind the display bezel, making the required overlay designs differ. This means that a large inventory and an on-demand design capability be maintained unless the touch screen manufacturer wishes to severely limit the display models to which his technology can be applied. Furthermore, retrofitting displays for overlay touch screens is usually a complicated and specialized job, not easily performed in the field.

Non-overlay touch screens have thus far been largely unsuccessful in the marketplace, due largely to the awkwardness of the approaches which have heretofore been taken. One such device includes a linear array of perhaps twenty-five infrared light-emitting diodes placed along one side of a display and a matched linear array of infrared detectors along the other side. When touching the display screen, the operator's finger breaks a light beam, thus indicating position on the vertical axis of the display. A similar arrangement at the top and bottom of the display is employed to determine horizontal axis position. As implemented, this prior art system provides relatively low precision in determining two-dimensional position. Because the diodes have to be placed a significant distance out from the display screen, parallax is also a problem. While this system obviously has the ability to detect the approach of a finger or stylus some distance above the display, it actually is forced to use this above-display point as precisely equivalent to touching the display. This detection of a touch before it actually happens results in a poor feel and lack of tactile response, and contributes greatly to the lack of success of the sensor.

Light pens are one of the oldest display interaction technologies available. Light pens are not usually classed with touch screens, mainly for historical reasons. They require a special stylus (the light pen) which typically must be tethered to a controller via a cord carrying an electronic or optical signal from the display unit. Light pens require that a delicate balance be struck between the persistence of the display and the achievable horizontal resolution, a problem which is aggravated by color displays, which require three phosphors, typically having different persistences. Light pens are completely non-functional in situations in which there are significant dark (unlighted) areas in the target display, especially problematical with monochrome displays. These impediments have prevented the widespread use of light pens despite their early availability.

It will be appreciated that, in systems of the type employing imaging systems placed strategically about a computer display, each imaging system includes a photodetector, such as a charge-coupled device (CCD) having a plurality of elements organized as an array, and a lens to focus an image of the pointer object onto the photodetector. Assuming the position of the object image on the sensor array can be accurately determined, the direction of the object relative to the imaging system can be determined in a straightforward manner since position within the photodetector array is related to the angular position within the field of view of the imaging system, typically in a nearly proportional manner. Given directions relative to at least two imaging systems, pointer object position can be determined by triangulation, as is disclosed for example in Denlinger U.S. Pat. No. 4,782,328.

Prior to the present invention, the resolution of such systems has generally been limited by the number of photodetector elements, although interpolation in some cases has been used to infer an image position between two detector elements, for example. As described in greater detail hereinbelow, such is a highly inefficient use of a CCD array.

SUMMARY OF THE INVENTION

Accordingly, it is an object of the invention to provide improved systems and methods for optically determining the direction of an object relative to an imaging system, particularly for application in systems for optically determining the position of an object within a generally planar viewing field, such as a touch screen.

Briefly, and in accordance with an overall aspect of the invention, rather than employing focused imaging systems to produce a sharp image at the plane of a photodetector, and to thus define the stylus for finger position, a deliberately diffuse or blurred image is employed. As explained in detail hereinbelow, it is possible to determine the position of the maximum intensity, and thus the direction of the object, to a small fraction of the distance between sample points, with an accordingly much higher resolution than prior art focused systems.

The diffusion produces a characteristic "bell-shaped" or Gaussian intensity distribution. The image-producing capability which is essential to prior art systems is abandoned because we already know what the image should look like. There is a trade-off between position-determining capability and object-recognition capability which is exploited by the subject invention. Another advantage is that the diffusion of the invention serves to make the system relatively insensitive to objects other than the pointer which the system is designed to recognize.

In accordance with a more particular aspect of the invention, a system for optically determining the direction of an object comprises a photodetector having a plurality of detector elements extending in at least one dimension, and elements for projecting a diffuse image of the object onto the photodetector such that each of the detector elements produces an output signal corresponding to the intensity of that portion of the diffuse image which is projected onto the particular detector element. As noted above, the diffuse image has a characteristic intensity distribution. The system additionally includes a data analyzer connected for receiving the output signals from the detector elements, which are taken as a data set, and is operable to locate the position of the diffuse image on the photodetector by recognizing a characteristic intensity distribution of the diffuse image.

For example, the position of the diffuse image can be located by performing a least squares fit of a predetermined intensity distribution function (e.g. a Gaussian distribution function) known to correspond with the characteristic intensity distribution to the output signals from the detector elements. Alternately, a transform, a filter, or other signal processing technique can be used on the output signals from the detector elements to extract the intensity distribution function. As yet another alternative, a transform may be performed on the output signals from the detector elements taken as a data set.

Any one of a variety of techniques may be employed to produce the required diffusion. Examples include focusing the lens by positioning the photodetector where it is not in the image plane (focal plane) of the lens. A diffuser such as a frosted screen or a layer of petroleum jelly in the optical path may be employed. Various forms of fiber optic diffusers may be employed, such as fiber optic fans.

In accordance with another aspect of the invention, there is provided a system for optically determining the position of an object within a generally planar viewing field. The system includes at least a pair of imaging systems in the same plane as the viewing field and arranged to view the object within the viewing field from different angular positions. Each of the imaging systems includes a photodetector having a plurality of detector elements extending in at least one dimension, and elements for projecting a diffuse image of the object onto the photodetector such that each of the detector elements produces an output signal corresponding to the intensity of that portion of the diffuse image which is projected onto the particular detector element. Again, the diffuse image has a characteristic intensity distribution. A data analyzer is connected for receiving the output signals from the detector elements, taken as a data set, and operable to locate the position of the diffuse image on each of the photodetectors by recognizing the characteristic intensity distribution of the diffuse image, and thereby to determine the direction of the object relative to each of the imaging systems, and to determine the position of the object by triangulation based on the thus-determined directions.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1A:
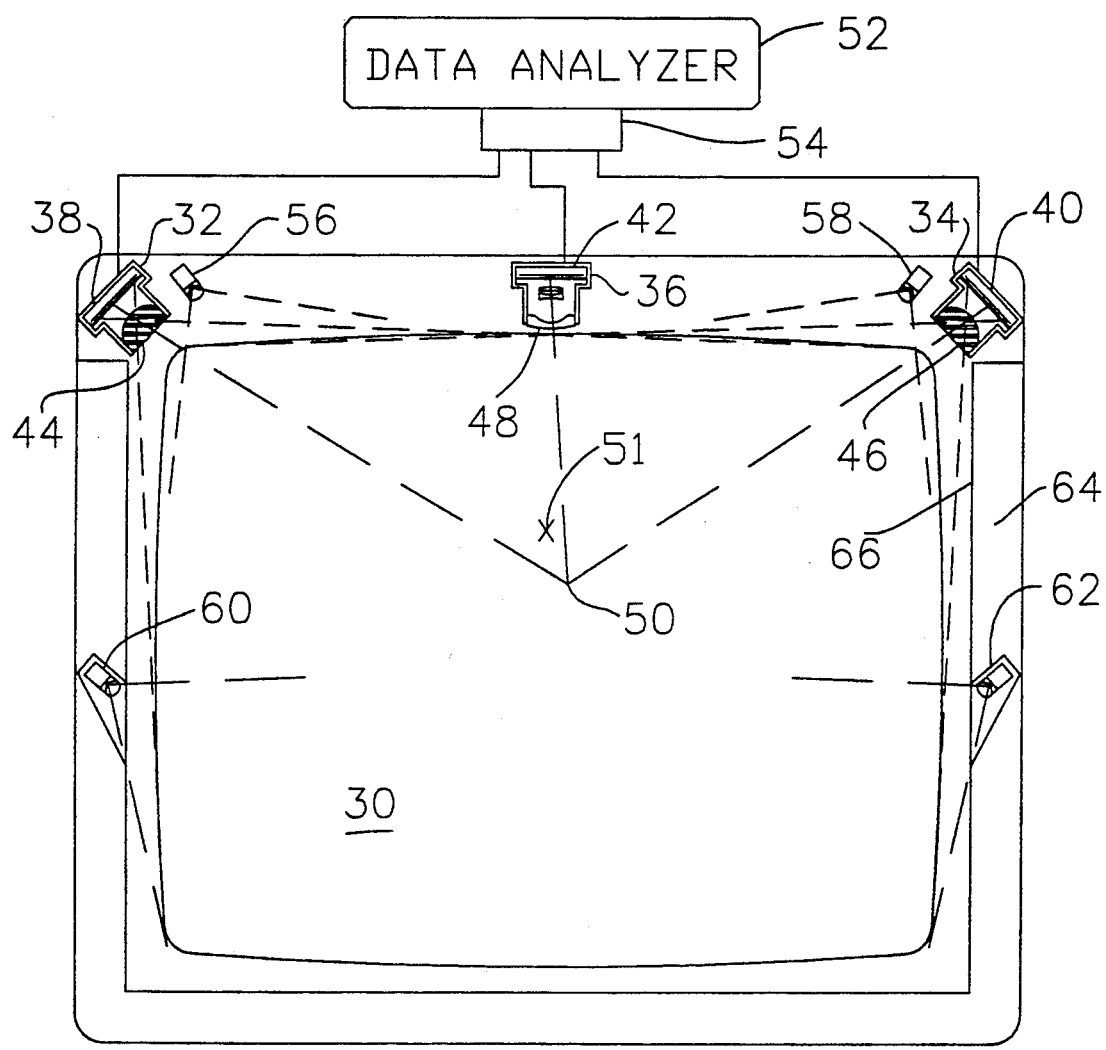
FIG. 1A is a touch screen device embodying the invention, partially in schematic form.
Figure 1B:
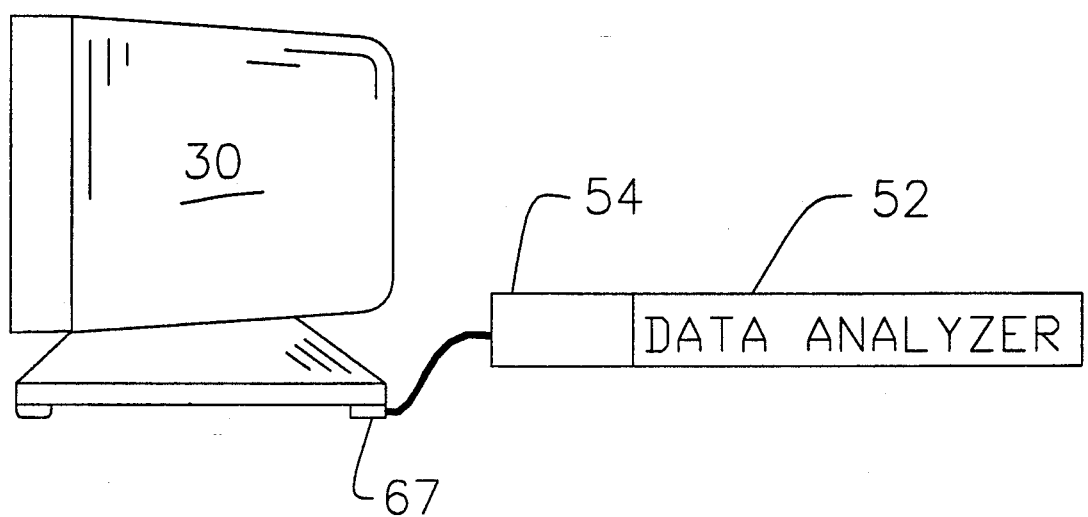
FIG. 1B is a side view of the touch screen device, partially in schematic form.

Referring first to FIG. 1, a computer display device 30 has a pair of suitably-mounted imaging systems or cameras 32 and 34 positioned at the upper corners, and an optional central camera 36 to improve resolution near the upper middle region of the display 30.

In general, the requirement for a camera is that it produce a representation of a field of view from its vantage point that can be used in an analysis to determine the position of specific objects in that field of view. This may likely involve the reduction of the image to digital form for use in a computing device, but it is also possible to produce a device in which analog video data are used directly in determining the position of objects in the field of view. The camera may therefore be a real video camera in the usual sense of the word, such as the $\frac{1}{4}$" CCD (charge-coupled device) arrays currently in common use, producing a digitized two-dimensional depiction of the scene in terms of the levels of light (visible or invisible) perceived from the vantage point. It may also be any arrangement of devices such as lenses, light carrying devices such as fiber-optic cables, electric signal carrying cables, and light-sensing devices such as CCD arrays. So long as the camera effect is achieved, the physical layout of equipment to achieve the effect can be varied as required to produce a reasonable physical layout as constrained by the resulting cost and appearance of the device. The use of a lens or similar device in a camera allows the position information to be gathered using a small, standard device rather than a device which must be varied to match the dimensions of the display as is the case with most touch screen technologies.

In the particular arrangement of FIG. 1, the cameras 32, 34 and 36 include respective linear CCD photodetectors 38, 40 and 42, such as Texas Instruments TSL-214 devices. Each TSL-214 device has 64 photosensitive cells arranged in a linear array approximately 5/16 inch in length. The cameras 32, 34 and 36 also include respective fixed lenses 44, 46 and 48. By way of example and not limitation, the focal length of the lenses 44, 46 and 48 is in the 3.0 to 4.5 mm focal length range. The corner cameras 32 and 34 have nominal 90° wide aperture lenses 44 and 46, while the central camera 36 has a 150° to 180° coverage lens 48.

Significantly, the lenses 44, 46 and 48 are positioned so as to focus at distances greater than the distance across the display 30, or even "beyond infinity". Thus, the photodetectors 38, 40 and 42 do not lie in image planes in which an image of a pointer object 50 is sharply focused.

Outputs of the photodetectors 38, 40 and 42 are connected to a data analyzer 52 which comprises an analog-to-digital converter 54, and a computer suitably programmed to perform the analysis described in detail hereinbelow.

A pair of primary infrared light sources 56 and 58 are positioned near the corner cameras 32 and 34, and each have a nominal 90° spread, with a relatively narrow spread out of plane. Optional secondary infrared light sources 60 and 62 are also provided, with a slightly narrower in-plane spread. All four infrared light sources 56, 58, 60 and 62 are characterized as high output. Associated with the display 30 is a bezel 64 which has a background frame 66 that is non-reflective at the infrared wavelengths employed.

General principles relating to the FIG. 1 configuration will now be discussed with reference to FIGS. 2A, 2B, 3, 4A and 4B.

Figure 2A:
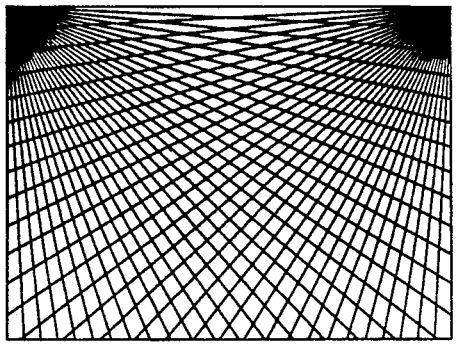
FIGS. 2A and 2B are diagrams depicting resolution over different areas of the touch screen when two cameras are employed.
Figure 2B:
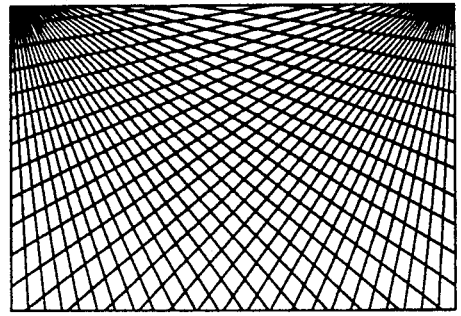

Preferably, there are just two camera positions in the upper corners of a display as depicted. (Although the discussion is of rectangles herein, the display can obviously be of any shape and the "upper" corners may be any adjacent corners. In fact, cameras can be positioned anywhere about the active area.) Since what the cameras distinguish is essentially the angular position of the finger or stylus, the sensitivity pattern of this arrangement is shown in FIGS. 2A and 2B. As shown, the lines are spaced apart by an equal angle. It can be seen that the coverage of the rectangle, although non-linear, is quite good with the exception of the region near the top of the rectangle between the two cameras.

Figure 3:
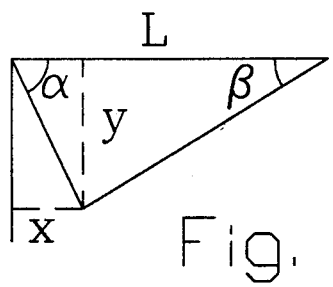
FIG. 3 depicts the geometry involved in determining x and y coordinates by triangulation, given angles.

FIG. 3 represents the geometry for triangulation, where the x and y coordinators are given by the equations $$x = \frac{\tan \alpha}{\tan \alpha + \tan \beta} L \text{ and } y = x \tan \beta.$$

Directly between the cameras there is a singularity in the descriptive equations, where $\alpha = \beta = 0$.

From FIG. 2A, it is apparent that the vertical position is well-determined in the region between the cameras, but that slight errors in the angle lead to large errors in the sensed horizontal position.

In practice, this singularity is not a problem. Response is usably accurate except for a narrow band near the top of the rectangle. Most displays are designed so that the cameras can be positioned some distance outside the rectangle that represents the active display area, as in FIG. 2B. In fact, most current touch screen technologies have similar requirements for an inactive region near the edges of a display.

Figure 4A:
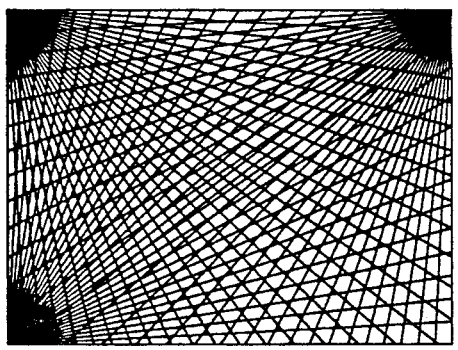
FIGS. 4A and 4B are diagrams comparable to FIGS. 2A and 2B, but employing three cameras.
Figure 4B:
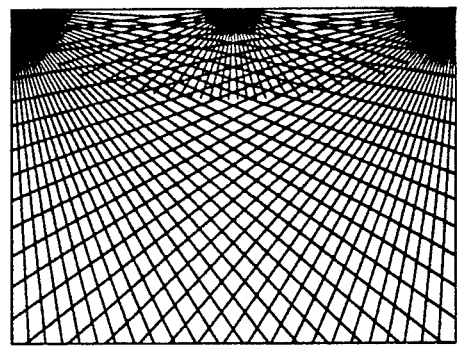

When required, however, accuracy in the region between cameras can be improved by adding the third camera position. Depending upon other requirements, lighting in particular, the third camera can be positioned along the side or in another corner, as shown in FIG. 4A, which gives complete and accurate coverage of the entire rectangle.

If conditions dictate, accuracy in the region between cameras can be substantially improved by positioning a third camera between the two corner cameras. A 180° camera is shown, although cameras serving lesser angles clearly would also be useful in increasing accuracy. Although in this case the three cameras are still situated so that singularities exist between them, FIG. 4B (which corresponds with FIG. 1) shows that the accuracy in the upper region is substantially improved.

Lighting considerations are important to the overall accuracy of the system. The system can be made to work using ambient light, but greater dependability can be achieved using controlled lighting. The three basic forms of lighting are using a self-illuminated stylus, using a lighted background, and using specific light sources to illuminate a stylus or finger. Each method can be more useful in specific situations.

Controlled, specific, light sources allow backgrounding, that is, taking periodic camera readings with the specific illumination turned off, and also allow operation using only a narrow band of light wavelengths. LED's or IRLED's are particularly useful in this regard. Such specific sources can be few or numerous and can be spaced around the rectangle of interest as required. Care must be taken to arrange or shade such light sources so that they do not shine directly into any camera or to sequence camera readings and illumination sources so that this does not happen.

A favored mode places two or more light sources along the top of the rectangle with the cameras, with the light sources lensed in such a way as to produce essentially a sheet of light parallel to the rectangular surface. That sheet of light registers as a band of light across the finger or stylus which passes through it. Background readings can be taken when the light sources are momentarily switched off and can then be subtracted from the illuminated readings to produce a signal free of background interference for analysis. It is the preferred mode of operation to provide a background that is black. This blackness, or absorption of light from the illumination source, need prevail only in the wavelengths of light sensed by the cameras. Thus, if the light sources are infrared and the cameras are supplied with infrared-passing filters, the background may be visibly white or colored, so long as it absorbs in the infrared.

It is also possible to operate without a special background if it is known that there will be no interfering, highly-illuminated objects. As can be seen from the equations, x and y are not restricted to be within the active region of the display, so this system is quite capable of sensing that an illuminated object is beyond the rectangle of interest and can be made to ignore such signals.

A system using an illuminated background also can use a narrow band of light wavelengths to minimize interference from external illumination sources. In this case, however, it is often more convenient to use a diffused wide-band background illumination and a narrow-band filter on the cameras. Illuminated backgrounds can be especially useful in situations where ambient light is bright and confusing enough to hamper the operation of a specific light source design.

A self-illuminated stylus has the disadvantage of requiring a special stylus. The advantages however are several. First, because the stylus itself is the light source, there is no difficulty in providing a light which overpowers ambient illumination. Second, accuracy can be significantly better than is possible with finger touch, since the "stylus" is smaller and the light source makes its true point position better defined. Third, because the light source is relatively intense, there is less problem in determining when the stylus is actually in use. And fourth, the stylus may send out modulated or other signals to indicating touch-down or other operator messages.

Figure 5:
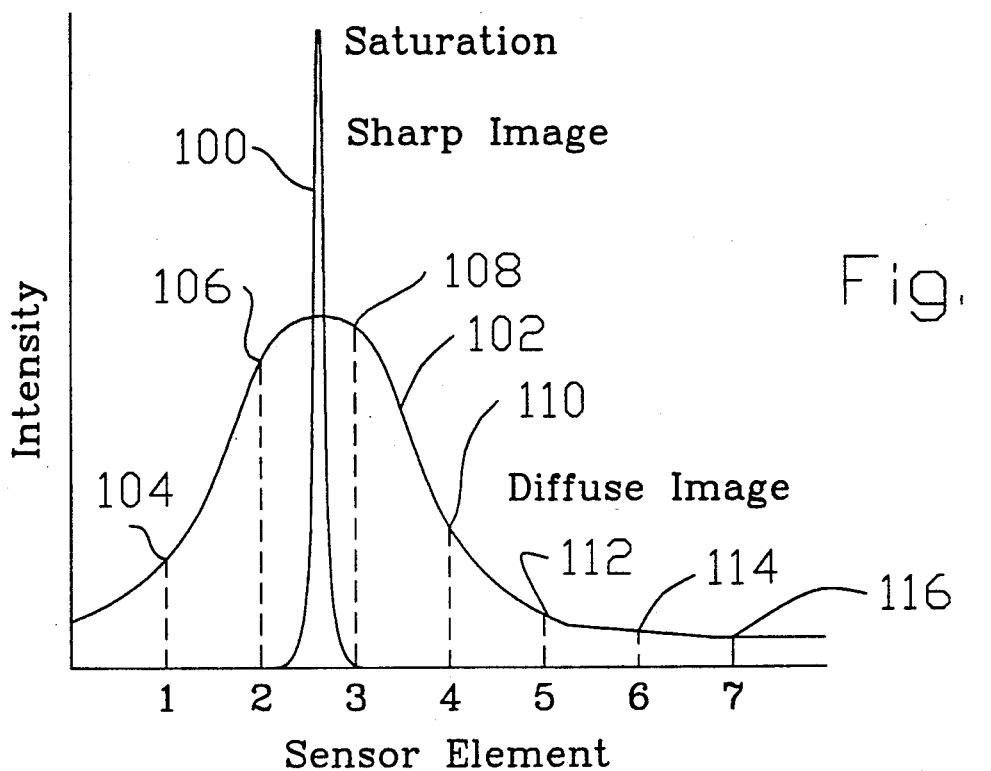
FIG. 5 is a plot of light intensity versus position along a photodetector array for both a sharp image and a diffuse image.

As noted above, a significant aspect of the invention is the use of diffuse or fuzzy images, produced such as by a deliberate lack of focus. With reference now to FIG. 5, if one begins to look carefully at the process of using a high-precision photodetector, such as a linear CCD array to determine the position of a point light source, such as an illuminated pen tip, it is seen as a very inefficient use of the photodetector array. Typically, only one or two cells are illuminated, often to saturation of the cell, and the rest of the cells are dark. The position of the pen is determined by the number of the cell that is illuminated, or the centroid number if more than one cell is illuminated. The sharp peaked curve 100 in FIG. 5 illustrates this behavior.

CCD cells are however quite capable of sensing the intensity of light, typically distinguishing hundreds of levels of intensity. In the typical prior art approach, intensity information is used at just two levels; present or absent. Furthermore, it is not at all clear that there is any way of using intensity information to improve the process. Thus, related prior art devices use focused cameras to product a sharp image at the CCD plane and thus define the stylus or finger position.

In accordance with the subject invention, intensity information is employed to advantage. Thus, if one completely abandons the concept of a sharp image and places a diffusion plate over the lens, for example, a point light source, such as an illuminated pen tip, will produce a characteristic "bell-shaped" intensity distribution 102. Because this shape 102 is characteristic, in fact symmetric in this case, if one samples the light intensity at several points 104, 106, 108, 110, 112, 114 and 116 within the curve, it is possible to determine the position of the maximum intensity to a small fraction of the distance between sample points. Thus many fewer CCD cells, for example, are required to determine the position of the light source to a given precision using a diffuse, blurred image. Note that samples taken at the evenly spaced positions 104, 106, 108, 110, 112, 114 and 116 completely miss the sharp image 100, while such samples would quite adequately determine the position of the diffuse image 102.

We are not getting something for nothing here. We have abandoned the image-producing capability which is so key to the previous systems because we already know what the image should look like. In information theory terms, we are using the ability to precisely determine light intensity to augment an accurate but imprecise position measurement. There is a trade-off between position-determining capability and object-recognition capability, so the pointer object must be very distinctive in intensity. This is easily true of an illuminated-tip pen. It is also true of an opaque object, such as a finger, obscuring a diffuse light-source, such as a diffuse light panel mounted around the perimeter of a display screen. It is also true of a properly illuminated object. Rather than being a disadvantage, the diffusion serves to make the system relatively insensitive to image details other than the pointer which the system is designed to recognize. Although a lens and diffusion plate is used in the example above, the fact that most clearly separates diffusion-assisted and sharp-image position detection is that no lens, slit, or other light-ray sharp focusing device is actually required by the diffusion-assisted method.

We have discovered that the intentional use of diffuse images carries a significant side benefit. Because defocusing is one means of producing a diffuse image, focus is a minor concern at most in constructing a camera for our use. In a focused-camera application, one must pay careful attention to maintaining a depth-of-field sufficient to keep the stylus or finger in reasonably sharp focus over the complete range of distances from the camera that the stylus or finger might be placed. Indeed, in that usage, lack of focus can lead directly to a lack of accuracy or precision. Thus in focused-camera devices, the lens aperture must be kept small, and often a pinhole or slit is used to insure adequate depth-of-field. This in turn requires that bright incident illumination or an illuminated stylus be used. In one instance with our intentionally diffuse system, we have used a lens with an aperture approximately twice its effective focal length (f 0.5) with complete success. Likewise, for our usage the optical quality of the lens is of only minor importance; most of the imperfections that are usually of concern in lens design merely contribute to the diffusion.

Diffusion can be achieved through any of several mechanisms, and will in any case be the result sum of several mechanisms. Depending upon the situation, the precise nature of diffusion can be selected to advantage.

Possible sources of diffusion include: 1) de-focus or other lens- (or pinhole- or slit-) related imaging imperfections, 2) intentionally placing a diffusion device such as a frosted screen or a layer of petroleum jelly in the optical path, 3) digital- or analog-derived combination of the input intensities to produce mathematical or other non-optical diffusion, and 4) diffusion of the pointer object itself relative to a point source of light. As constrained by the typical size of a touch screen, the human finger itself is relatively broad and is thus a naturally diffuse pointer object in comparison to a point source. These various sources of diffusion are subject to varying amounts of control in the design of a system and the required diffusion will generally result from a partially controlled combination of the several sources.

Figure 6:
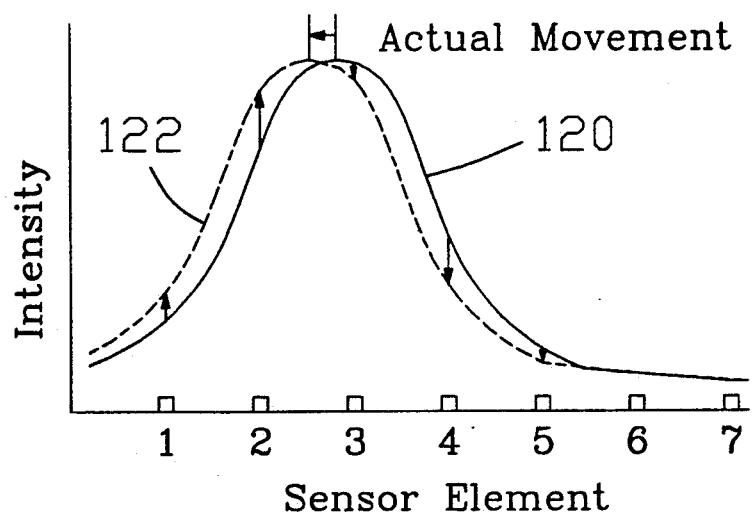
FIG. 6 is a plot of light intensity versus position along a photodetector array in the case of motion of the diffuse image.

As just described with reference to FIG. 5, diffusion is used to produce an intensity curve of known shape and with intensities varying along its length, the Gaussian distribution being physically and mathematically very usable. Referring now also to FIG. 6, motion of the known shape can then be tracked as it passes over a discrete array of sensors and located with a precision that is a small fraction of the distance between sensors. A Gaussian curve 120 is again shown in FIG. 6, with a shifted version 122 shown in dotted line representing an actual movement to the left of about one-fourth the distance between sensor elements. The sensor elements to the left of the central peak experience varying, but very specific, increases in light intensity, while those to the right experience decreases. A further slight difference in position makes a corresponding slight difference in the length of each of the arrows in the diagram. From this it will be appreciated that measurement of movement of the curve 120,122 between two sensor element positions is essentially a continuous process, the precision being limited more by the error in the individual intensity measurements than by the distance between sensors. Of course, other factors, such as how well the intensity shape is known, also influence the precision.

Although there are similarities, the process of finding the exact position of a curve of known characteristics is not the same as what is commonly called interpolation. Typically, interpolation is applied with little, if any, regard for the known characteristics of the shape, and the interpolation polynomial or other mathematical form is applied to as few points as possible in the vicinity of the area of interest, the concept being that whatever mathematical form is being used will provide a better approximation to the real curve over a small region. In doing this, the interest would be in finding the peak intensity and its position. We are much more interested in finding and tracking the position and characteristics of the overall intensity shape curve than in tracking its localized peak intensity, which may move somewhat relative to the position of the overall shape. The approximate Gaussian we are tracking, the blurred image of a finger, for example, is likely to be the sum of many closely spaced Gaussians from individual point light sources on the finger. As hand position changes, these individual Gaussian sources will shift somewhat relative to one another while still maintaining a good approximation to a complete Gaussian overall. It is thus more stable and generally better to track the complete shape rather than interpolating the peak intensity.

Figure 7:
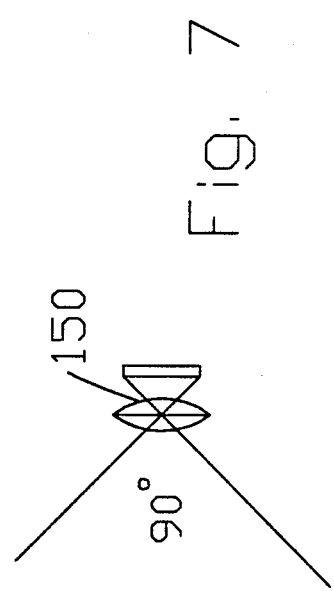
FIG. 7 is a schematic representation of a simple lens with its focal center arranged to give the lens 90° coverage.

Considering now several possible sources of diffusion in greater detail, FIG. 7 shows a simple lens 150 with its focal center arranged to give the lens 90° coverage. In the simplest of cases, the coverage can be considered to be linear with angle, and the position of the lens 150 arranged to give the proper coverage. Because we use a diffuse image, the usual requirement that a wide angle lens provide accurate edge-to-edge focus is not at all important. Likewise, non-linear angle coverage in extreme wide angle lenses is not important, since any non-linearity can be corrected, if necessary, as part of the x, y position calculation. Some attention must be given to aperture shadowing at wide angles. The so-called cosine correction whereby the circular lens aperture looks like an ellipse when viewed from the side is the first of these effects. This phenomenon, which effectively reduces light passage at side angles, is often accentuated by the three-dimensional aspect of the lens.

Figure 8:
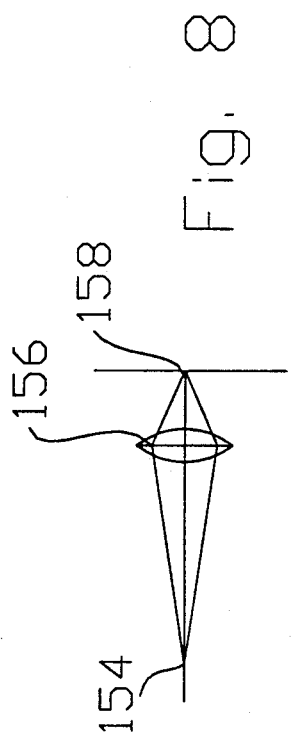
FIG. 8 is a schematic representation of a focused lens system resolving a single point directly in front of the lens onto a linear sensor.

FIG. 8 shows a focused lens system resolving a single point 154 directly in front of a lens 156 onto a linear sensor 158, which runs perpendicular to the surface of the paper.

Figure 9:
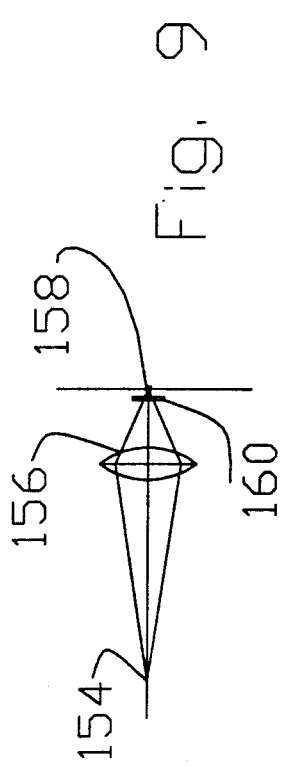
FIG. 9 is a schematic representation similar to FIG. 8, but showing the use of a diffuser.

As shown in FIG. 9, the image can be diffused by placing a diffusing sheet 160 directly in front of the linear sensor 158. The actual diffusion sheet 160 would be much less conspicuous than shown in FIG. 9, very likely being a spray coating on the surface of the linear sensor array chip 158.

Figure 10:
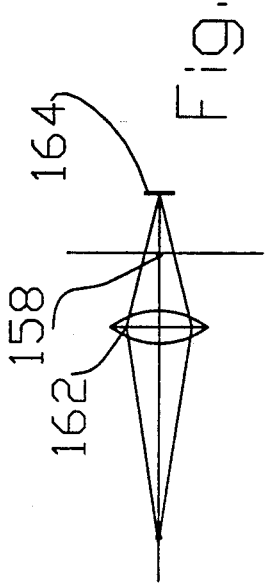
FIG. 10 is a schematic representation of a lens system which produces diffusion by de-focusing the image.

FIG. 10 schematically shows a lens system which is producing diffusion by de-focusing the image, in this case by using a lens 162 with a longer natural focal length positioned the same distance from the linear sensor array as in the figures above. Thus the image plane is at 164. The triangular shape shown is in reality a three-dimensional cone, so that several adjacent cells of the linear sensor array 158 receive light from the object point. This representation is somewhat simplistic in that the true distribution of light approximates a Gaussian distribution rather than falling off sharply at the edges of the cone, but the general concept is correct.

Figure 11:
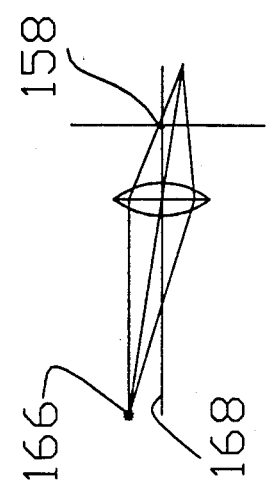
FIG. 11 is a schematic representation of a lens system depicting the situation wherein a light source is positioned above the plane which should be imaged on a linear sensor.

The use of a defocused image has a side effect that is of importance in designing a diffused image system. In FIG. 11, a light source 166 is positioned above the plane 168 which should be imaged on the linear sensor 158. Because the image is de-focused, the cone of light from the source is picked up by the sensor, giving a false or interfering signal. Thus, even if a special black background is erected to cover the image plane which the sensor is designed to see, a de-focused system can also see extraneous light sources which are at a low angle above the barrier.

Figure 12:
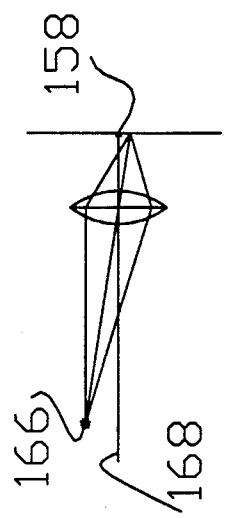
FIG. 12 is a schematic representation of a focused image system under the same conditions as FIG. 11.

As shown in FIG. 12, a focused image system does not have this problem (although internal reflections may still create similar problems in focused systems). Even if a diffusion sheet is used in the focused system, the sheet can be narrow enough to just cover the linear sensor 158, and thus not be subject to the same problem as in FIG. 11. In practice, a compromise must be struck. The background, and even more so the extraneous light source are necessarily relatively far from the lens, and a lens which is focused for distance will still be diffuse for nearer objects. Thus, in practice, the lens is more nearly focused for distance, and supplementary diffusion is used if necessary for satisfactory performance near the edges of the display.

The light intensity pattern on the linear sensor 158 is essentially a sum of Gaussian distributions each resulting from some illuminated source in the field. The position of the finger or stylus can be represented by the mean, $\mu$, of the Gaussian which corresponds to the finger or stylus. There are many ways of analyzing the intensity data to extract $\mu$, and the following has been found to a reasonable compromise between computational intensity and dependability of the algorithm.

Figure 13:
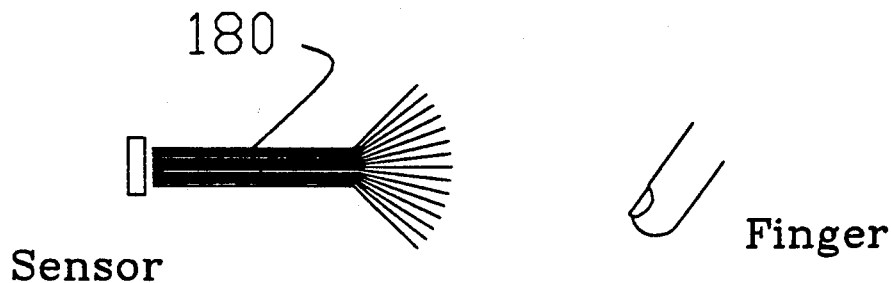
FIG. 13 depicts a fiber optic fan employed as a diffuser.
Figure 14:
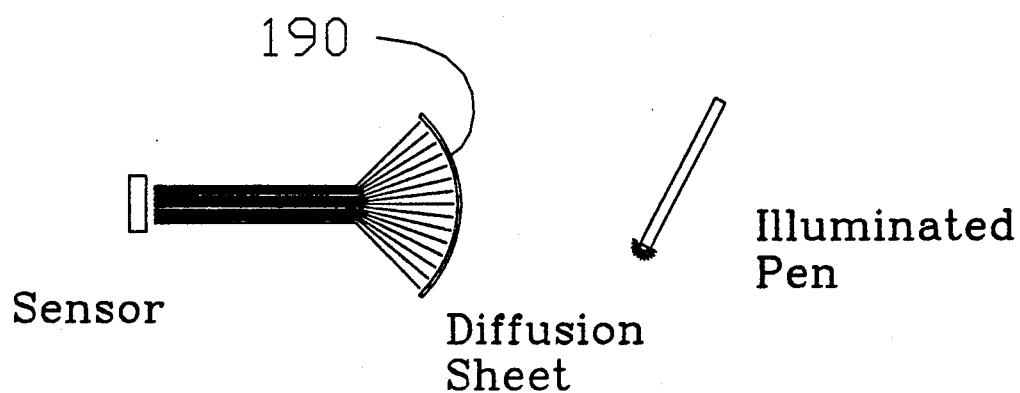
FIG. 14 depicts a fiber optic fan with an auxiliary diffusion sheet.
Figure 15:
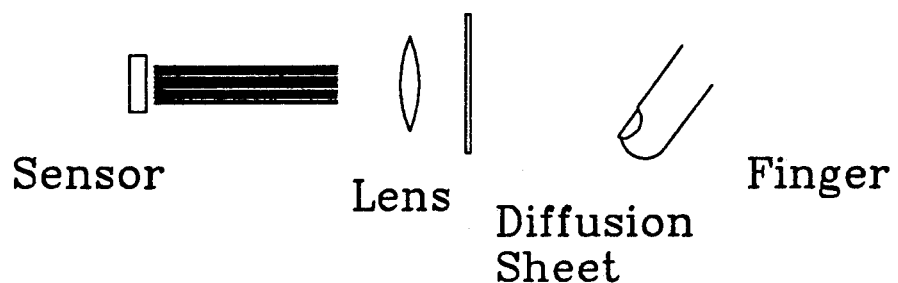
FIG. 15 depicts a lens and diffuser employed with a bundle of optical fibers.

The diffusion-assisted position locating concept also makes it possible to employ fiber optic elements 180 as an active part of the system rather than just passive message carriers. FIGS. 13, 14 and 15 show three different arrangements of lenses and fiber optics.

The configurations of FIGS. 13 and 14 have no lens at all. An optical fiber has the characteristic that it will accept light which enters an acceptance cone which typically ranges about ±30° from the center axis of the fiber. This makes the optical fiber a diffuser in itself, without a lens or other image sharpening device.

By arranging the fibers in a fan shape, as shown in FIGS. 13 and 14, the acceptance cone for each fiber takes in a slightly different range of angles over the entire scene and the arrangement behaves much like a lens-and-diffuser system, but without requiring a lens. Thus, the fiber fans have the property of averaging light intensity over a range of angles as depicted in FIG. 5.

The arrangement in FIG. 14 uses a diffuser 190 to better control the amount and nature of diffusion experienced in a fiber. The optical fiber by itself has a sharper cut-off of light intensity at the extreme angles of the acceptance cone than would be the case for an ordinary diffuser, and the use of a diffusion sheet 190 can correct this if it proves desirable to do so. Note that there is no reason a diffuser could not be effectively used between the fibers and the CCD sensor rather than at the opposite end of the fibers.

FIG. 15 uses a lens and diffusion sheet to feed light directly to an optical fiber, so that the effect is more nearly that of sampling a specific angle in the graph of FIG. 5. Clearly, the configuration of FIG. 15 offers more control over the degree of diffusion than is possible in either FIGS. 13 or 14. If this increased control is necessary, it is available.

For best performance, this system of the invention requires a separate detection of touchdown. When an illuminated stylus is used, this can be achieved by having a tip switch in the stylus that causes a separate signal to be sent to the system controller. Although there is a current active market for LED matrix touch screens which detect the finger above the display and thus do not detect touch well, this behavior limits the usefulness of these devices. With finger activated devices, some other detection is required. We use methods which involve detecting the small motion of the display that comes with the force of touch. We have used with success a touch detector 67 consisting of a piezoelectric speaker surrounded on each side by foam sponge ($\frac{1}{8}$" uncompressed) to act as a spring allowing small motions and positioned under the rear edge of a standard CRT display. The output of detector 67 is applied through A/D converter 54 to data analyzer 52. The sudden shifts in the mean of the harmonic motions detected by this device indicate that the display has been touched. These are true touch events if the camera devices also detect that the display screen is being touched. Such motion can be detected employing piezo devices, strain gauges, devices which depend upon resistive changes, as well as devices in which the motion brings closer the plates of a variable capacitor, or LVDT-like devices in which the inductance of a coil is varied through motion. It will be understood that detector 67 is intended to illustrate one simple example of a motion detector system for detecting touch of the screen, and other known touch detection systems could be substituted therefor.

Careful implementation and data analysis can also handle "backgrounding" in a fairly straightforward manner. As a practical illustration, consider a system in which the stylus (or finger) is illuminated using infrared LEDs as a source. The illumination can be either internal or external to the stylus. In environments which may experience intense stray illumination, as from auto headlights, carnival lights, or the like, the CCD sensors may give false readings. If the LED illumination is cycled on and off in synchronization with the CCD reading cycles, the illumination may be intentionally left off for some cycles and the resulting CCD reading used as background.

By way of specific example, using a clock-driven analog to digital converter (ADC), data are taken representing the light intensity observed at each of the 64 sensors of the Texas Instruments TSL214 in each of the two or three cameras being used. This data taking operation is initiated at regular intervals typically in the range of 1/25th to 1/100th of a second, the interval being decided mainly by the time required to produce an intensity amplitude sufficient for analysis in the dimmest area of the field.

These data are read into the digital computer memory (for example using direct memory access, an interrupt or by polling the ADC). The data are then analyzed using the following process:

First, the intensity data are corrected for background intensity (if necessary) by subtracting out a background value for each of the 64 cells. These background values typically comprise the average intensity seen by the cell in quiescent periods. The objective is to produce a clean signal that does not contain spurious peaks of intensity that might confine the following process, particularly in the locating of the peak region. In a well-controlled lighting situation, background subtraction may not be necessary at all.

The data are then searched for a region including a peak value of intensity. This is currently done by searching for the set of n sequential points for which the intensities sum to the highest value. Our experience is that values of n in the range of 6 to 10 produce good results with a 64 element sensor. The central position of the n points is then taken as a reference.

Starting from the central point, and going in both directions, the array of data is examined to find the first point index below some threshold percentage (typically 60% to 80%) of the average intensity in the peak region. The lowest index in this region is called l and the highest, h. This process defines a region which encompasses the peak region of the dominant Gaussian and avoids the tail areas where the dominant Gaussian may be confounded with non-dominant peaks.

The light intensity pattern in the selected region is primarily the Gaussian distribution resulting from the finger or stylus in the field and its position can be represented by the mean, $\mu$, of that Gaussian. The current method used for extracting $\mu$ is by least-squares fitting of the data in the region to the Gaussian curve, (although other methods might be used). The Gaussian distribution is $$y = \frac{A}{\sigma} e^{-\frac{(x-\mu)^2}{2\sigma^2}},$$

in which y is the intensity, x is the position within the array, running from 1 to 64, and $\sigma^2$ is the variance. This equation can be transformed to $$\ln y = A_0 + A_1 x + A_2 x^2, \text{ where}$$

$$A_0 = \left[ \ln \frac{A}{\sigma} - \frac{\mu^2}{2\sigma^2} \right], A_1 = \frac{\mu}{\sigma^2},$$

and $$A_2 = -\frac{1}{2\sigma^2}.$$

Thus, if the A's are determined $$\mu = -\frac{A_1}{2A_2}.$$

The form for ln y above is suitable for applying linear least squares, whereby $$\begin{bmatrix} A_0 \\ A_1 \\ A_2 \end{bmatrix} = \begin{bmatrix} \sum_{i=1}^{n} w_i & \sum_{i=1}^{n} w_i x & \sum_{i=1}^{n} w_i x_i^2 \\ \sum_{i=1}^{n} w_i x & \sum_{i=1}^{n} w_i x_i^2 & \sum_{i=1}^{n} w_i x_i^3 \\ \sum_{i=1}^{n} w_i x_i^2 & \sum_{i=1}^{n} w_i x_i^3 & \sum_{i=1}^{n} w_i x_i^4 \end{bmatrix}^{-1} \begin{bmatrix} \sum_{i=1}^{n} w_i \ln y_i \\ \sum_{i=1}^{n} w_i x_i \ln y_i \\ \sum_{i=1}^{n} w_i x_i^2 \ln y_i \end{bmatrix},$$

where $n = h - l + 1$ is the number of joints selected for the peak region and $w_i$ is a suitably chosen weighting factor. In the standard application of least squares to the original Gaussian equation for $y_i$, the weighting factor would be chosen as $w_i = y_i$ to compensate for the logarithmic transformation that was required to use linear least squares. In the method currently used, however, this weighting factor is used to aid in producing a smooth progression of $\mu$ as the Gaussian distribution moves across the array of cells. This is achieved by using weights which are largest near the central, peak values of the distribution and diminish to much smaller values at the ends of the selected arrays. If $y_c$ is the central (nominal maximum) intensity, and $p = \max(c, n-c-1)$, then one suitable weighting factor is $$w_i = (|c - 1| - p)^q \text{ and another is } w_i = \frac{1}{(|c - i| + 1)^q}$$

each of which has been used successfully with $q = 1, 2$ and 3. Optimal choice of the weighting function depends upon the diffusive characteristics of the cameras. Because in this process all of the intensities usually have been selected to be within 60% or closer to the highest intensity, the logarithmic transformation is usually superfluous in application. Because it saves computation time, $y_i$ is generally used in place of $\ln y_i$ in the above equations. Additionally, when using weighting factors similar to those described above, it is seen that the inverse least-squares matrix above does not depend upon the intensities, y, and can therefore be computed and inverted in advance. Because sets of n points, where n<64, are generally used, and n is variable, when using this approach it is necessary to precompute a number of inverse matrices and to select the proper one of these to use in each computation.

The ends of the 64 element array require special consideration during this selection and weighting process. As stated above, the distribution of weights must take place about the nominal maximum value, $y_c$, but if $y_c$ is near either end of the array, it is important that the weights still center about $y_c$ even though the end of the array will truncate the symmetrical effect. This approach causes the progression of $\mu$ to remain uniform even near the ends of the array.

Note that this approach yields $$\sigma^2 = \frac{-1}{2A_2}$$

as well as $\mu$. The value of $\sigma$ is a useful diagnostic. The value of $\sigma$ represents the relative broadness of the Gaussian curve and depends not only upon the diffusiveness resulting from the camera system but also on diffusiveness resulting from the size of the subject. Thus values of $\sigma$ which should validly represent, say, a finger touching the display typically fall within a narrow range and $\sigma$ is only weakly dependent on the image size and intensity. When the analysis results in a value of $\sigma$ outside that range, the analysis can be rejected as not representing a true finger touch. Similarly, when controlled illumination is used, a valid touch within the display area will be found to produce at least a certain minimum intensity, and signals below that level can be safely rejected as invalid.

With an ordinary camera and lens, the value of $\mu$, which represents a position within the sensor array, is directly proportional to the angular position in the field of view of that camera. Thus, $$\alpha = \alpha_0 + \Delta\alpha \frac{\mu}{64},$$

where $\alpha$ is the angular position of the object in the field, $\alpha_o$ is a calibration bias to correct for the true camera angular position, and $\Delta\alpha$ is the angular field of view represented by the 64 cells in the array. Both $\alpha_o$ and $\Delta\alpha$ are determined through calibration in the field. Similarly, for the second camera, $$\beta = \beta_0 + \Delta\beta \frac{\mu}{64},$$

and $\beta$ represents the angle of the object in the field of view of that camera.

If $\alpha$, measured counter-clockwise, is for a camera positioned in the upper right corner of a rectangle and $\beta$, measured clockwise, is for a camera positioned in the upper left corner of the same rectangle, with the distance L between the focal centers of the two cameras, then $$x = \frac{L \tan \alpha}{\tan \alpha + \tan \beta} \text{ and } y = x \tan \beta,$$

where x is measured from left to right across the rectangle and y is measured from top to bottom of the rectangle. The distance L is generally taken through field calibration rather than by direct measurement.

If it is necessary to use a third camera to adequately cover the less precise region at the top between the two cameras, that camera may be placed in another corner, in which case the data analysis simply pairs the new camera with one of the two at the upper corners to perform and proceeds as above.

If a super-wide angle camera is used between the two at the top corners of the rectangle, then x and y are determined from the two corner cameras as above, with x being discarded. The Gaussian curve fit is the same for the central camera as for the corner cameras with the exception that, if an angle-distorting lens, such as a fish-eye, is used, the angle is no longer be linear with position in the 64 element array and correction appropriate for the lens must be made. If the center camera is positioned a distance $$C \approx \frac{L}{2}$$

from the left corner camera, and a distance y above the line between the corner cameras and the angle for the center camera, $\gamma$, is measured counterclockwise, then $x = C + (Y+y) \tan(\gamma - 90°)$, where y is as determined from the corner cameras. Again, C and Y are generally determined by field calibration rather than by direct measurement.

Pairs of x, y coordinates are reported whenever the above process produces valid results and the point falls within the active area of the display and the computed value of $\sigma$, the spread of the Gaussian representing the stylus or finger touching the display, falls within a valid range. If the touch sensing device senses that the display has actually been touched during a period of valid display, then the touch event is also reported.

The foregoing specific example can be summarized as the following steps:

(1) At intervals of nominally 1/50th second, a clock-driven analog to digital converter (ADC) reads light intensity data from each of the 64 sensors of the Texas Instruments TSL214's in each of the two or three cameras being used. The data are entered into the memory for a digital central processing unit (CPU) using direct memory access or interrupt, as appropriate for the processor.

(2) Using the CPU, each array of 64 values is treated as described in steps (2a) through (2h).

(2a) First, a background intensity is subtracted out from the each intensity datum, the background being determined previously as an average intensity seen by the cell in quiescent periods. This step may not be required if the quiescent signal is well-behaved. If the resulting intensities are below a pre-determined threshold value, indicating no touch present, abandon the process for this time interval.

(2b) Search through the 64 points to find the 7 intensities in sequence which have the highest sum. Call the array index of the central point in these 7, c.

(2c) Starting from the lowest index of the 7 points and decreasing the index, search for the first intensity below 0.6 of the average intensity of the seven points determined above and call its index l. Starting at the highest indexed of the seven points and going up in index, find the first intensity below 0.6 of this same average and call its index h.

(2d) Operating in the region between l and h, fit the Gaussian distribution $$y = \frac{A}{\sigma} e^{-\frac{(x-\mu)^2}{2\sigma^2}}$$

in which y is the intensity, x is the position within the array, running from 1 to 64, $\mu$ is the mean of the Gaussian, which can be taken as the precise position of the target object, again from 1 to 64, and $\sigma^2$ is the variance. Use the logarithmic transformation of this equation: ln $y = A_0 + A_1 x + A_2 x^2$, where $$A_0 = \left[ \ln \frac{A}{\sigma} - \frac{\mu^2}{2\sigma^2} \right], A_1 = \frac{\mu}{\sigma^2}, \text{ and } A_2 = -\frac{1}{2\sigma^2},$$

so that once the A's are determined $$\mu = -\frac{A_1}{2A_2}.$$

(2e) Step (2d) is realized by forming the sums in the following equation, inverting the least squares matrix, and multiplying the inverse matrix by the y sum matrix to obtain A's.

$$\begin{bmatrix} A_0 \\ A_1 \\ A_2 \end{bmatrix} = \begin{bmatrix} \sum_{i=1}^{n} w_i & \sum_{i=1}^{n} w_i x & \sum_{i=1}^{n} w_i x^2 \\ \sum_{i=1}^{n} w_i x & \sum_{i=1}^{n} w_i x^2 & \sum_{i=1}^{n} w_i x^3 \\ \sum_{i=1}^{n} w_i x^2 & \sum_{i=1}^{n} w_i x^3 & \sum_{i=1}^{n} w_i x^4 \end{bmatrix}^{-1} \begin{bmatrix} \sum_{i=1}^{n} w_i \ln y_i \\ \sum_{i=1}^{n} w_i x_i \ln y_i \\ \sum_{i=1}^{n} w_i x_i^2 \ln y_i \end{bmatrix},$$

where $n = h - l + 1$ is the number of points selected for the peak region. This process can be speeded up, computationally, without harm, by pre-forming and pre-inverting an appropriate set of the x sum matrices to be used in the process and also by using $y_i$ in place of ln $y_i$ in the y sum matrix.

(2f) The term $w_i$ used in the above is a weighting factor which places the heaviest weight on the point indexed with c, tapering to a much lower weight at l and h. Symmetry about c is preferred. The form $$w_i = \frac{1}{(|c - i| + 1)^2}$$

is easily computed and generally works well.

(2g) Compute $$\sigma^2 = \frac{-1}{2A_2} \text{ as well as } \mu = -\frac{A_1}{2A_2}.$$

If the value of $\sigma$ is imaginary or not within a predetermined band that has been selected to represent a valid touch (using the present equipment) abandon the analysis for this time period.

(2h) Calculate the angular position from the value of $\mu$ using $$\alpha = \alpha_0 + \Delta\alpha \frac{\mu}{64},$$

where $\alpha$ is the angular position of the object in the field, $\alpha_0$ is a calibration bias to correct for the true camera angular position, and $\Delta\alpha$ is the angular field of view represented by the 64 cells in the array. Both $\alpha_0$ and $\Delta\alpha$ are determined earlier through calibration. If the camera has a fish-eye or other non-linear lens, further corrections to the angle calculation may also be required in this step to correct for the non-linearity.

(3) After obtaining valid measurements of $\alpha$, measured counter-clockwise, for a camera positioned in the upper right corner of a rectangle and $\beta$, measured clockwise, for a camera positioned in the upper left corner of the same rectangle, then compute $$x = \frac{L \tan \alpha}{\tan \alpha + \tan \beta}$$

and $y = x \tan \beta$, where x is measured from left to right across the rectangle and y is measured from top to bottom of the rectangle. The distance L is the distance between cameras, but is calculated from an initial calibration rather than by direct measurement.

(4) If the point measured in step (3) is located in the region at the top of the rectangle between the two corner cameras and better accuracy is required, complete the analysis using the value of $\gamma$, the angle measured counterclockwise from a super-wide angle camera between the two at the top corners of the rectangle. This camera is at a distance $$C \approx \frac{L}{2}$$

from the left corner camera, and a distance Y above the line between the corner cameras. Compute $x = C + (Y + y) \tan(\gamma - 90°)$ where y is as determined from the corner cameras. Again, C and Y are generally determined by field calibration rather than by direct measurement.

(5) Report the pairs of x, y coordinates. If the touch sensing device senses that the display has actually been touched during a period of valid display, then also report that the display has been touched.

(6) Starting at the next time interval, repeat the entire analysis.

From the above discussion, it will be appreciated that the present invention provides a method and apparatus whereby the pointer object 50 shown in FIG. 1A is precisely located by photodetectors, such as photodetectors 38, 40 and 42. In the preferred embodiment, the photodetectors 38 and 40 are positioned at the upper corners of the display 30 and the detector 42 is positioned at the top center of the display 30. In this arrangement, the pointer object 50 is located or positioned precisely with respect to the photodetectors by triangulation as previously described. Since the photodetectors are placed in a known position with respect to the display 30, the position of the pointer object 50 with respect to the screen 30 is also known. In the preferred embodiment, the data analyzer 52 (computer) is programmed to display a cursor 51 on the screen 30 as soon as a pointer object 50 is detected near the display 30 (about 1 inch from the display 30) by the photodetectors 38, 40 and 42. The cursor 51 may be displayed in a position precisely corresponding with the center of the pointer object 50 or the cursor may be displaced slightly with respect to the object 50 as illustrated in FIG. 1A where the cursor 51 is displaced upwardly and to the left of the pointer object 50. In some circumstances, a slight displacement of the cursor may prove to be an advantage. For example, if a finger is used as the pointer object 50, and the cursor 51 is positioned directly in the center of the finger, the finger will hide the cursor when the screen is touched. By displacing the cursor upwardly and slightly to the left, the cursor 51 will remain visible to the user at all times, even when the screen is being touched. In such a case, a line from the center of object 50 to cursor 51 is oblique (not perpendicular) to the display 30. Thus, by displacing the cursor 51 slightly with respect to the pointer object 50, one may actually achieve greater precision, because the user will always have a visual feedback as to the cursor position, even when the screen is being touched.

Also, by displaying a cursor before the screen is actually being touched, the user may more accurately position the pointer object 50 and touch the screen at the desired location, which is normally required on a touch screen to select a desired function.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A system for optically determining the direction of an object, said system comprising:
   a photodetector having a plurality of detector elements extending in at least one dimension;
   elements for projecting a diffuse image of the object onto said photodetector such that each of said detector elements produces an output signal corresponding to the intensity of that portion of the diffuse image which is projected onto the particular detector element, the diffuse image having a characteristic intensity distribution; and
   a data analyzer connected for receiving the output signals from said detector elements and operable to locate the position of the diffuse image on said photodetector by recognizing the characteristic intensity distribution of the diffuse image.

2. A system in accordance with claim 1, wherein said elements for projecting a diffuse image comprise a lens arranged to focus a sharp image of the object at an image plane, in which said photodetector is not positioned.

3. A system in accordance with claim 2, wherein said photodetector is positioned between said lens and the image plane.

4. A system in accordance with claim 1, wherein said elements for projecting a diffuse image comprise a focusing lens and a diffuser positioned between said lens and said photodetector.

5. A system in accordance with claim 1, wherein said elements for projecting a diffuse image comprise a plurality of optical fibers, one end of each of said optical fibers being arranged to collect optical radiation and the other end of each of said optical being arranged to deliver optical radiation to one of said detector elements.

6. A system in accordance with claim 5, wherein said one ends of said optical fibers are arranged in a fan configuration so that each optical fiber collects optical radiation from a different direction.

7. A system in accordance with claim 5, wherein an optical path is defined between the object and said photodetector, and which system further comprises a diffuser positioned in said optical path.

8. A system in accordance with claim 6, wherein an optical path is defined between the object and said photodetector, and which system further comprises a diffuser positioned in said optical path.

9. A system in accordance with claim 1, wherein said data analyzer includes elements for locating the position of the diffuse image on said photodetector by performing a least squares fit of a predetermined intensity distribution function known to correspond with the characteristic intensity distribution to the output signals from said detector elements.

10. A system in accordance with claim 9, wherein the predetermined intensity distribution function is a Gaussian intensity distribution function.

11. A system in accordance with claim 1, wherein said data analyzer includes elements for locating the position of the diffuse image on said photodetector by performing a signal processing operation to extract from the output signals from said detector elements the characteristics of a predetermined intensity distribution function known to correspond with the characteristic intensity distribution.

12. A system in accordance with claim 11, wherein the predetermined intensity distribution function is a Gaussian intensity distribution function.

13. A system in accordance with claim 1, wherein said data analyzer includes elements for locating the position of the diffuse image on said photodetector by performing a transform on the output signals from said detector elements taken as a data set.

14. A system in accordance with claim 1, which comprises an element for illuminating the object with radiation having a recognizable characteristic.

15. A method for optically determining the direction of an object, said method comprising:
    projecting a diffuse image of the object onto a photodetector having a plurality of detector elements extending in at least one dimension such that each of the detector elements produces an output signal corresponding to the intensity of that portion of the diffuse image which is projected onto the particular detector element, the diffuse image having a characteristic intensity distribution;
    locating the position of the diffuse image on the photodetector by recognizing the characteristic intensity distribution of the diffuse image.

16. A method in accordance with claim 15, wherein said step of projecting a diffuse image comprises employing a lens to focus a sharp image of the object at an image plane in which the photodetector is not positioned.

17. A method in accordance with claim 15, in which said step of projecting a diffuse image comprises employing a plurality of optical fibers, with one end of each of the optical fibers being arranged to collect optical radiation, and the other end of each of the optical fibers being arranged to deliver optical radiation to one of the detector elements.

18. A method in accordance with claim 17, which comprises employing a plurality of optical fibers with the one ends of the optical fibers arranged in a fan configuration so that each optical fiber collects optical radiation from a different direction.

19. A method in accordance with claim 15, wherein said step of projecting a diffuse image comprises employing a diffuser.

20. A method in accordance with claim 15, wherein said step of locating the position of the diffuse image on the photodetector comprises performing a least squares fit of a predetermined intensity distribution function known to correspond with the characteristic intensity distribution to the detector element output signals.

21. A method in accordance with claim 20, wherein the predetermined intensity distribution function is a Gaussian intensity distribution function.

22. A method in accordance with claim 15, wherein said step of locating the position of the diffuse image on the photodetector comprises performing a signal processing operation to extract from the output signals from said detector elements the characteristics of a predetermined intensity distribution function known to correspond to the characteristic intensity distribution.

23. A system in accordance with claim 22, wherein the predetermined intensity distribution function is a Gaussian intensity distribution function.

24. A method in accordance with claim 15, wherein said step of locating the position of the diffuse image on the photodetector comprises performing a transform on the output signals from said detector elements.

25. A system for optically determining the position of an object within a generally planar viewing field, said system comprising:
- at least a pair of detector systems in the same plane as the viewing field and arranged to view the object within the viewing field from different angular positions, each of said detector systems including a photodetector having a plurality of detector elements extending in at least one dimension, and elements for projecting a diffuse image of the object onto said photodetector such that each of said detector elements produces an output signal corresponding to the intensity of that portion of the diffuse image which is projected onto the particular detector element, the diffuse image having a characteristic intensity distribution;
- a data analyzer connected for receiving the output signals from said detector elements, and operable to locate the position of the diffuse image on each of said photodetectors by recognizing the characteristic intensity distribution of the diffuse image and thereby to determine the direction of the object relative to each of said detector systems, and to determine the position of the object by triangulation based on the determined directions.

26. A system in accordance with claim 25, wherein said elements for projecting a diffuse image comprise a lens for each of said detector systems arranged to focus a sharp image of the object at an image plane in which said photodetector is not positioned.

27. A system in accordance with claim 26, wherein, in each of said detector systems, said photodetector is positioned between said lens and the image plane.

28. A system in accordance with claim 25, wherein said elements for projecting a diffuse image comprise, for each of said detector systems, a focusing lens and a diffuser positioned between said lens and said photodetector.

29. A system in accordance with claim 28, wherein said elements for projecting a diffuse image comprise, for each of said detector systems, a plurality of optical fibers, one end of each of said optical fibers being arranged to collect optical radiation and the other end of each of said optical being arranged to deliver optical radiation to one of said detector elements.

30. A system in accordance with claim 29, wherein, for each of said detector systems, said one ends of said optical fibers are arranged in a fan configuration so that each optical fiber collects optical radiation from a different direction.

31. A system in accordance with claim 29, wherein, for each of said detector systems, an optical path is defined between the object and said photodetector, and which system further comprises a diffuser positioned in said optical path.

32. A system in accordance with claim 30, wherein, for each of said detector systems, an optical path is defined between the object and said photodetector, and which system further comprises a diffuser positioned in said optical path.

33. A system in accordance with claim 25, wherein said data analyzer includes elements for locating the position of the diffuse images on each of said photodetectors by performing a least squares fit of a predetermined intensity distribution function known to correspond with the characteristic intensity distribution to the output signals from said detector elements.

34. A system in accordance with claim 33, wherein the predetermined intensity distribution function is a Gaussian intensity distribution function.

35. A system in accordance with claim 25, wherein said data analyzer includes elements for locating the position of the diffuse images on each of said photodetectors by performing a signal processing operation to extract from the output signals from said detector elements the characteristics of a predetermined intensity distribution function known to correspond with the characteristic intensity distribution.

36. A system in accordance with claim 35, wherein the predetermined intensity distribution function is a Gaussian intensity distribution function.

37. A system in accordance with claim 25, wherein said data analyzer includes elements for locating the position of the diffuse image on each of said photodetectors by performing a transform on the output signals from said detector elements taken as a data set.

38. A system for determining the position of an object adjacent to a surface of a display having a perimeter, said system comprising:
- at least a pair of detector systems positioned outside of and adjacent to the perimeter of the display and arranged to view the object from different angular positions and to view the object when it is positioned on the surface of the display and when the object is positioned adjacent to the surface of the display, but spaced apart from the display, each of said imaging systems including a photodetector and elements for projecting a light pattern corresponding to the object onto said photodetector such that said photodetector produces output signals corresponding t the intensity distribution of the light pattern; and
- a data analyzer connected for receiving the output signals and operable to locate the position of the light pattern on each of said photodetectors and thereby to determine the direction of the object relative to each of said imaging systems, to determine the position of the object by triangulation based on the determined directions, and to display a cursor on the display at a position corresponding to the position of the object, said cursor being displayed when the object is adjacent to, but spaced apart from, the display.

39. The system of claim 38 further comprising a touch sensor for sensing a touch of the object to the display, producing a touch signal when a touch is sensed, and transmitting the touch signal to said data analyzer.

40. The system of claim 38 wherein said data analyzer displays the cursor at a position on the display that is shifted with respect to the object so that a line from the object to the cursor is oblique with respect to the screen.

* * * * *